United States Patent [19]

Gold

[11] 3,831,191

[45] Aug. 20, 1974

[54] DOUBLE-HEAD CONFIGURATION FOR MAGNETIC DISK FOR MAXIMUM DENSITY RECORDING

[75] Inventor: David E. Gold, Los Gatos, Calif.

[73] Assignee: International Business Machines Corporation, Armonk, N.Y.

[22] Filed: June 27, 1973

[21] Appl. No.: 374,204

[52] U.S. Cl. .................................... 360/22, 360/71

[51] Int. Cl. ........................................... G11b 15/12

[58] Field of Search ............. 360/22, 61, 63, 64, 78, 360/97, 106

[56] References Cited

UNITED STATES PATENTS

| | | | |
|---|---|---|---|
| 2,800,642 | 7/1957 | May | 340/174.1 C |
| 3,153,241 | 10/1964 | Ramrath et al. | 340/174.1 C |
| 3,191,164 | 6/1965 | Lekas | 340/174.1 C |
| 3,384,880 | 5/1968 | Duinker et al. | 340/174.1 C |
| 3,399,392 | 8/1968 | Funazuka | 340/174.1 C |
| 3,402,403 | 9/1968 | Lichowsky | 340/174.1 C |

*Primary Examiner*—Vincent P. Canney
*Attorney, Agent, or Firm*—Nathan N. Kallman; Couglas R. McKechnie

[57] ABSTRACT

Two read/write heads are mounted on an arm of a disk access mechanism on opposite sides of the axis of rotation of a disk and collinearly aligned with the axis. The heads can simultaneously read and write on two physical tracks, at a given time, where data is recorded at maximum density. Each pair of physical tracks associated with the two heads at a given position comprises a single logical track where all of the logical tracks of a particular disk have a constant length.

5 Claims, 3 Drawing Figures

DOUBLE-HEAD CONFIGURATION FOR MAGNETIC DISK FOR MAXIMUM DENSITY RECORDING

BACKGROUND OF THE INVENTION

1. Field of the Invention

This invention relates to magnetic disk direct access storage devices. More particularly, it relates to a double headed configuration for the access mechanism of a disk drive which allows data to be recorded on all tracks at a maximum density.

2. Prior Art

In a magnetic disk drive, a customary way to record data is to record it on a given disk in a series of concentric tracks. As there is a limitation on the density which data can be recorded, a known way to record on a given disk is to record at the maximum density on the innermost track and to have each track contain the same number of bits. Thus, the density of recording in the tracks that are further removed from the center decreases as the track radius increases. This arrangement, while it has many advantages, has the disadvantage that the maximum or most efficient use of the available storage area is not taken advantage of.

It has been proposed within the prior art to eliminate this disadvantage by recording data in each track at the maximum density throughout the entire disk surface. An example is disclosed in U.S. Pat. No. 2,800,642 — May. In accordance with this patent, because of the variable frequency of the signals associated with reading and writing on different tracks, a synchronizing or timing disk is also used to provide suitable timing signals. This patent is of further interest in that it shows two heads mounted on the scanning arm of an access mechanism where the scanning arm is pivotally mounted for movement in a plane so as to accurately swing the read/write heads across the surface of each disk. The tracks are concentrically arranged and it is apparent that each track contains a different maximum number of bits. The tracks are handled independently both logically and physically.

SUMMARY OF THE INVENTION

One of the objects of the invention is to provide a novel head configuration for use in a magnetic disk device wherein data is recorded on each disk at a maximum recording density in each of a plurality of concentric tracks.

Another object of the invention is to provide a novel head configuration wherein two physical tracks are logically combined or associated to form a single logical track and wherein all of the so-formed logical tracks of a magnetic disk are of constant length.

Still another object of the invention is to provide a simple head configuration having a reduced seek time.

Briefly stated, the manner in which the above and other objects of the invention are obtained is to mount two read/write heads on the access arm of an access mechanism where the heads are positioned diametrically on opposite sides of the axis of rotation of the disk. An arm positioner moves the heads simultaneously back and forth between the various concentric tracks. The physical tracks are paired up to form logical tracks of constant length, the pairing being done by combining the outermost track with the innermost track to form the first logical track and combining successive inward and outwardly located tracks to form additional logical tracks.

The above and other objects, features and advantages of this invention will be apparent from the following description of a preferred embodiment thereof as illustrated in the accompanying drawing.

DESCRIPTION OF THE DRAWING

Referring now to the drawing, FIG. 1 shows a direct access storage system including a disk drive DD attached to a control unit CU which would be connected to receive and transmit data to and from a channel of a data processing system. Except for the novel head configuration and the buffering arrangement within the control unit to handle the combining of data read from two tracks, or written to both tracks, the control unit and disk drive are of any known conventional prior art construction. DD includes an access mechanism 13 which may be similar to that disclosed in U.S. Pat. No. 3,534,344. The mechanism includes an arm positioner 14 for moving an access arm radially inwardly and outwardly. DD includes at least one magnetic disk 10 on which data is recorded in concentric tracks, the disk being mounted for rotation on a shaft 11 driven by a motor 12 at a constant speed of rotation. In accordance with the invention, access arm 15 has mounted thereon conventional read/write heads 16 and 17 that are disposed diametrically on opposite sides of the access of rotation of disk 10. A line extending between heads 16 and 17 passes through the axis of rotation and the line is coextensive with the direction of movement of access arm 15. This arm is slotted to provide freedom of movement about shaft 11.

Figure 1:
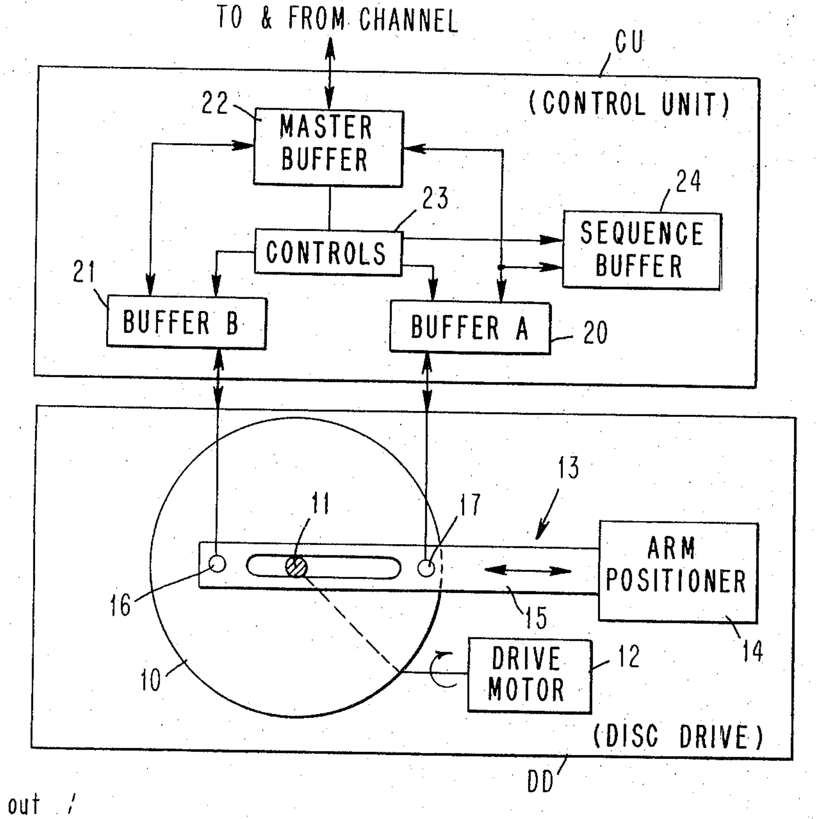
FIG. 1 is a schematic view of a magnetic disk drive system embodying the novel head configuration of the invention.

Control unit CU includes two buffers 20 and 21 which are connected to receive data from and transmit data to heads 16 and 17. The heads are arranged so as to be simultaneously operated for both reading and writing at the same time. Data is recorded by conventional means on each track and the buffers are arranged to accumulate a predetermined number of bits, for example eight, hereafter referred to as a byte. A master buffer 22 is connected to buffers 20 and 21 for assembling bytes in the proper sequence for transmission to and from the channel. The control unit CU includes conventional controls 23 for controlling the movement of data to the buffers. A sequence buffer 24 is adapted to hold a binary sequence or number for controlling which buffer 20 or 21 receives or transmits data to buffer 22. As will be explained in more detail hereafter, a sequence of bits controls the transfer of information whereby when a sequence bit is zero, one buffer is used and when a sequence bit is one, for example, the other buffer is used.

Figure 2:
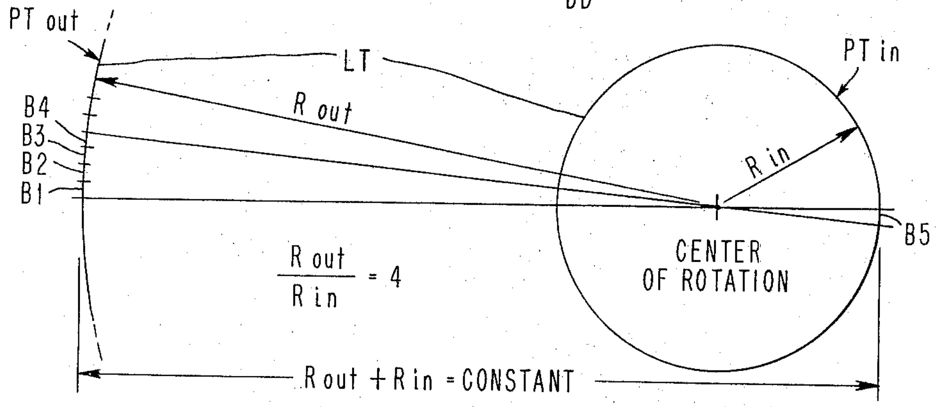
FIG. 2 is a schematic view illustrating the relationship of physical and logical tracks.

With reference to FIG. 2, a logical track LT comprises a physical logical track Ptout and a physical logical track PTin located at radiuses Rout and Rin respectively as measured from the center of rotation of the disk. It is to be understood that while FIG. 2 shows only one logical track, that the entire disk surface 10 would be comprised of a multiplicity of such logical tracks each composed of two physical tracks. It is to be noted that the sum of Rout plus Rin equals a constant and also equals the distance or spacing between read/write heads 16 and 17. Thus, when the heads are associated with or aligned on a logical track, one head is adjacent the outer track and the other is adjacent the inner track. By recording data on each track at a constant maximum density, then it becomes apparent that the total length of the logical track as measured both physically and in terms of the maximum number of bits recordable therein, remains constant even though the number of bits within each of the respective physical tracks differs because of their different radial distances.

For a given logical track LT, the ratio of Rout to Rin equals a constant that represents the difference in number of bytes recorded in a given sector of the disk. For the example shown in FIG. 2, the ratio is 4, and it means that four bytes B1–B4 are recorded within the same angular portion on outer track PTout while only one byte B5 is recorded on the inner track PTin. These bytes while physically separated as shown in the FIG. 2, are logically serially arranged as shown in FIG. 3.

Figure 3:
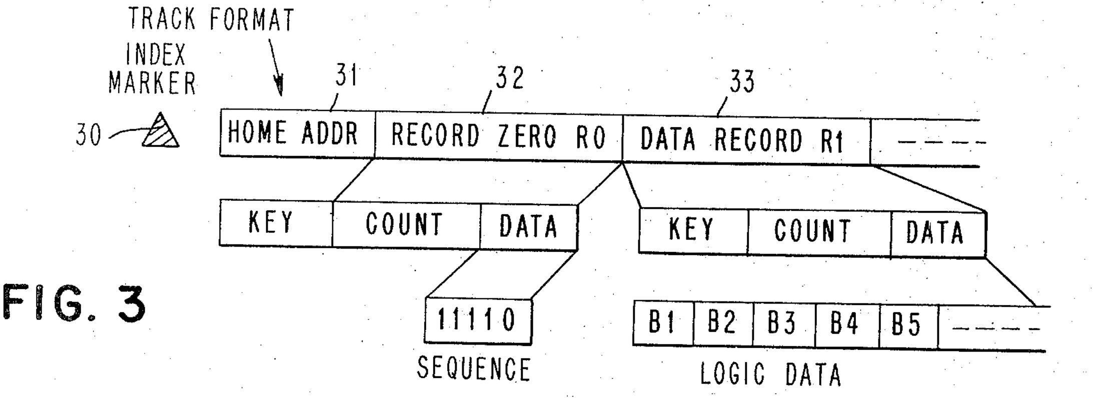
FIG. 3 is a schematic diagram of the track formats of an exemplary logical data structure.

With reference to FIG. 3, the basic track format is of a conventional nature where each track includes an index marker 30 followed by the home address portion 31, record zero portion 32 and subsequent data records 33. This general format is known and is described in "IBM System/360 components descriptions — 2841 and associated DASD," Form No. GA26-5988-7, copyright 1969 by IBM. Within this format, the data record 33 includes a key field, count field and data field where the data field comprises a number of serial bytes. Using the same example as used for FIG. 2, the bytes B1–B5 are successively logically arranged as shown in FIG. 3.

For a given logical track, it is apparent that the Rout to Rin ratio varies with each logical track whereby the physical location of the logical serial bytes differs for the respective tracks. Because the geometry of the disk drive is fixed, it should be obvious that for a given track, the location of a given byte would be a function of the radius of track and degree of angular displacement from the start of the track and that the sequence numbers for determining how the respective bytes should be combined can be readily calculable knowing the track address. While each calculation could be done on an individual basis as needed, an exemplary way to provide the sequence number is shown in FIG. 3. For each track, the sequence may be written in the data portion of record zero while the count portion indicates the length and repetitive characteristics of the sequence. After a track is first recorded, the sequence could be written into the sequence buffer 24 for controlling the operation. For the example used in FIGS. 2 and 3, the sequence number is 11110 which would cause the first four bytes to be placed in one buffer 1 being read from the disk and the fifth byte to be placed in the other buffer and the sequencing would be repeated for the remainder of the record.

A principal advantage of the above arrangement is that maximum storage efficiency is achieved by recording data in each of the tracks at the maximum density. Another advantage to the double-headed configuration is that retrieval time is lessened. This is accomplished because the number of logical tracks is half that of the number of physical tracks and therefore the number of necessary seek positions is effectively halved. This then yields seek or seek times which are on the average, half the seek time of conventional single head per arm. Similarly, because of the 180° spacing of the heads per logical track, there may exist no more than a 180° of rotational latency in retrieval of data depending on the head positioning algorithm used.

While the invention has been particularly shown and described with reference to a preferred embodiment thereof, it will be understood by those skilled in the art that various changes in form and detail may be made therein without departing from the spirit and scope of the invention.

What is claimed is:

1. In a magnetic disk drive having at least one magnetic record disk mounted for rotation about an axis of rotation and an accessing mechanism including an access arm means moveable linearly to different radial positions relative to said disk, the combination comprising:

a pair of read-write transducers;

said access arm means being shaped so as to position said transducers in diametrical alignment on opposite sides of said axis of rotation in alignment with the direction of linear movement of said access arm whereby, in each of said radial positions, said transducers are aligned with two physical tracks on said disk each of a different radial distance from the axis of rotation, the combined length of said tracks being constant.

2. The combination of claim 1 wherein data is recorded on said disk in a plurality of logical tracks, each logical track being associated with a different position of said arm and comprising the two physical tracks aligned with the position of said transducers.

3. The combination of claim 2 wherein data in each logical track comprises a series of successive bytes and the same data is recorded in the corresponding physical tracks in proportion to the radial distances thereof.

4. The combination of claim 3 including buffering means operative to combine data read from said physical tracks into said series of successive bytes and to break up said series for writing data on said tracks.

5. In a magnetic disk drive having magnetic record disk means mounted for rotation about an axis of rotation and an accessing mechanism including access arm means movable linearly to different radial positions relative to said disk means, the combination comprising:

a pair of read/write transducers mounted on said access arm means, wherein said access arm means is movable linearly so that as one transducer is moved between tracks of increasing radii, the other is moved between tracks of decreasing radii;

said access arm means being shaped so as to position said transducers relative to said magnetic record disk means so as to be in alignment, at each of said radial positions, with two physical tracks located on said disk means at different radial distances from the axis of rotation, information being recorded in said tracks at a constant bit density whereby the total number of bits recordable on said two tracks at each of said radial positions is constant.

* * * * *